US009890845B2

(12) United States Patent
Kobayashi et al.

(10) Patent No.: US 9,890,845 B2
(45) Date of Patent: Feb. 13, 2018

(54) TRANSMISSION

(71) Applicant: HONDA MOTOR CO., LTD., Tokyo (JP)

(72) Inventors: Heisuke Kobayashi, Wako (JP); Norikazu Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/421,705

(22) Filed: Feb. 1, 2017

(65) Prior Publication Data

US 2017/0241537 A1    Aug. 24, 2017

(30) Foreign Application Priority Data

Feb. 18, 2016    (JP) .................................. 2016-028614

(51) Int. Cl.
| F16H 57/021 | (2012.01) |
| F16H 1/28 | (2006.01) |
| F16H 37/04 | (2006.01) |
| F16H 57/08 | (2006.01) |
| B60K 6/365 | (2007.10) |
| B60K 6/48 | (2007.10) |
| B60K 6/547 | (2007.10) |

(52) U.S. Cl.
CPC ............. *F16H 57/021* (2013.01); *F16H 1/28* (2013.01); *F16H 37/04* (2013.01); *F16H 57/08* (2013.01); *B60K 6/365* (2013.01); *B60K 6/48* (2013.01); *B60K 6/547* (2013.01); *B60K 2006/4825* (2013.01); *B60Y 2200/92* (2013.01); *Y10S 903/91* (2013.01); *Y10S 903/919* (2013.01)

(58) Field of Classification Search
CPC .......... F16H 57/021; F16H 1/28; F16H 37/04; F16H 57/08; B60K 2006/4825; B60K 6/365; B60K 6/48; B60K 6/547; B60Y 2200/92
See application file for complete search history.

(56) References Cited

U.S. PATENT DOCUMENTS 8,517,876 B2 * 8/2013 Sakai .................... B60K 6/387
                                                        475/5
9,360,110 B2 * 6/2016 Minaminakamichi .. F16D 23/02
(Continued)

FOREIGN PATENT DOCUMENTS

| JP | 2015-137740 | 7/2015 |
| JP | 2015-175463 | 10/2015 |

OTHER PUBLICATIONS

Japanese Office Action dated Sep. 12, 2017, English translation included, 4 pages.

*Primary Examiner* — David J Hlavka
(74) *Attorney, Agent, or Firm* — Rankin, Hill & Clark LLP

(57) ABSTRACT

Provided a transmission including a first shaft, a second shaft connected thereto via a shift gear mechanism provided to a first shaft and generating a rotary output corresponding to a selected shift gear, a planetary gear mechanism, a transmission case for housing the planetary gear mechanism and a mounting member for fixing a ring gear of the planetary gear mechanism to the case. To the mounting member, an abutment support portion is formed for supporting the case by abutting to an inter-shaft portion positioned between the first shaft and the second shaft in the case.

3 Claims, 7 Drawing Sheets

(56) References Cited

U.S. PATENT DOCUMENTS

| | | | |
|---|---|---|---|
| 2009/0062058 A1* | 3/2009 | Kimes | F16H 1/28 |
| | | | 475/344 |
| 2012/0004063 A1* | 1/2012 | Koyama | B60K 6/36 |
| | | | 475/5 |
| 2012/0021861 A1* | 1/2012 | Sakai | B60K 6/365 |
| | | | 475/5 |
| 2015/0204438 A1 | 7/2015 | Ohnuki | |
| 2015/0260268 A1 | 9/2015 | Minaminakamichi et al. | |

* cited by examiner

TRANSMISSION

CROSS-REFERENCE TO RELATED APPLICATION

The present disclosure relates to a subject included in Japanese Patent Application 2016-028614 filed dated on Feb. 18, 2016, and, as a whole, the disclosure therein should be incorporated in this application explicitly by reference.

BACKGROUND OF THE INVENTION

Field of the Invention

The present invention relates to a transmission including a planetary gear mechanism for transmitting a driving force from a drive source.

Description of the Related Art

Conventionally, a transmission having a planetary gear mechanism having a sun gear, a pinion gear and a ring gear is available. For example, see Japanese Published Patent Application No. 2015-175463 (Patent Document 1). At the center of the planetary gear mechanism, the sun gear as an outer-toothed gear wheel is arranged. The pinion gears as a plurality of small outer-toothed gear wheels mesh with the outer periphery of the sun gear at an equal distance. Further, the outer periphery of the pinion gear meshes with the ring gear as an inner-toothed gear wheel. A rotating shaft of the pinion gear is mounted to a frame referred to as a "carrier". Due to this configuration, the planetary gear mechanism can change driving directions and gear ratios by inputting and outputting using the rotating shafts of the three gears, namely, the sun gear, the pinion gear and the ring gear and by fixing the same.

Here, in the transmission having such a planetary gear mechanism as disclosed in Patent Document 1, an inter-shaft distance between a shift shaft and a counter shaft (output shaft) needs to be short for the purpose of weight- and space-saving. A shortened inter-shaft distance enables minimization of the size of each gear, thereby achieving weight- and space-saving.

However, the shortened inter-shaft distance between the shift shaft and the counter shaft necessarily reduces thickness of the case between bearings supporting the shafts, thereby requiring larger strength of the case. As a large load occurs particularly to the counter shaft due to meshing of the gears and then the case supporting the counter shaft receives this load, the case needs to have particularly large strength.

SUMMARY OF THE INVENTION

The present invention was made in view of above-mentioned point, and the purpose is to provide a transmission that can support a plurality of shafts even with a short inter-shaft distance between the plurality of the shafts provided to the transmission.

Means for Solving the Problems

In order to solve the above-described problems, a transmission (50) in accordance with the present invention has a planetary gear mechanism (10), a case (51) of the transmission (50) and a mounting member (20). The planetary gear mechanism (61) includes a first input shaft (61) to which a driving force is input from an internal combustion engine, a second input shaft (63) connected to the first input shaft (61) via a shift gear mechanism installed to the first input shaft (61) to generate a rotary output corresponding to a selected shift gear, a sun gear (11) disposed to the first input shaft (61), a plurality of pinion gears (12) meshing with an outer periphery of the sun gear (11), a carrier (13) supporting the plurality of the pinion gears (12), a ring gear (15) meshing with the pinion gear (12) on the outer diameter side of the carrier (13). The case (51) of the transmission (50) houses the planetary gear mechanism (10). The mounting member (20) fixes the ring gear (15) of the planetary gear mechanism to the case (51). An abutment support portion (21a) is formed to the mounting member (20). The abutment support portion (21a) abuts to an inter-shaft portion (51a) positioned between the first input shaft (61) and the second input shaft (63) in the case (51).

In this manner, such configuration that the abutment support portion (21a) abuts to and thus supports the inter-shaft portion (51a) enables the inter-shaft portion (51a) to be supported by rigidity of the mounting member (20) in addition to rigidity of the case (51). Accordingly, even if the inter-shaft portion (51a) is configured to be short in width by setting a distance between the first shaft (61) and the second shaft (63) to be short, the abutment support portion (21a) of the mounting member (20) supports the inter-shaft portion (51a), thereby enabling stable support of the first shaft (61) and the second shaft (63). Therefore, while the distance between the first shaft (61) and the second shaft (63) serving as shift shafts of the transmission (50) is set to be short, the first shaft (61) and the second shaft (63) can be stably supported.

Moreover, in the above-described transmission (50), the abutment support portion (21a) of the mounting member (20) may support a load in the axial direction of the second shaft (63). Thus, even if a load is applied to the inter-shaft portion (51a) of the case (51) from the bearing (63B) supporting the second shaft (63) to which a large load occurs due to meshing of gears, the road can be properly supported.

Furthermore, in the above-described transmission (50), the mounting member (20) may have at least a first fixing member (30A) and a second fixing member (30B) for fixing the mounting member (20) to the case (51). And, the first fixing member (30A) and the second fixing member (30B) may be positioned so as to sandwich the abutment support portion (21a). Thus, by positioning the first fixing member (30A) and the second fixing member (30B) so as to sandwich the abutment support portion (21a), the abutment support portion (21a) can be fixed at the both sides thereof. Then, to the inter-shaft portion (51a) of the case (51) positioned between the first shaft (61) and the second shaft (63), the abutment support portion (21a) is fixed so as to intersect with a line (LX) connecting between a shaft center (61X) of the first shaft (61) and a shaft center (63X) of the second shaft (63). This can suppress deformation of the case (51), resulting in more stable support of the first shaft (61) and the second shaft (63).

Moreover, in the above-described transmission (50), the abutment support portion (21a) of the mounting member (20) may have a hollow portion (21b) formed in the manner that a portion of the abutment support portion (21a) facing an end portion of the second shaft (63) is hollowed. The hollow portion (21b) formed to the abutment support portion (21a) enables the second shaft (63) to be positioned closer to the first shaft (61) side than without the hollow portion (21b). Accordingly, the abutment support portion (21a) can keep the distance between the first shaft (61) and the second shaft (63) short while supporting the inter-shaft portion (51a). It should be noted that the bracketed reference numerals are examples of the elements of the embodiment described later.

According to the transmission in accordance with the present invention, while the distance between the plurality of the shafts provided in the transmission is set to be short, the plurality of the shafts can be supported stably.

DESCRIPTION OF THE EMBODIMENTS

Figure 1:
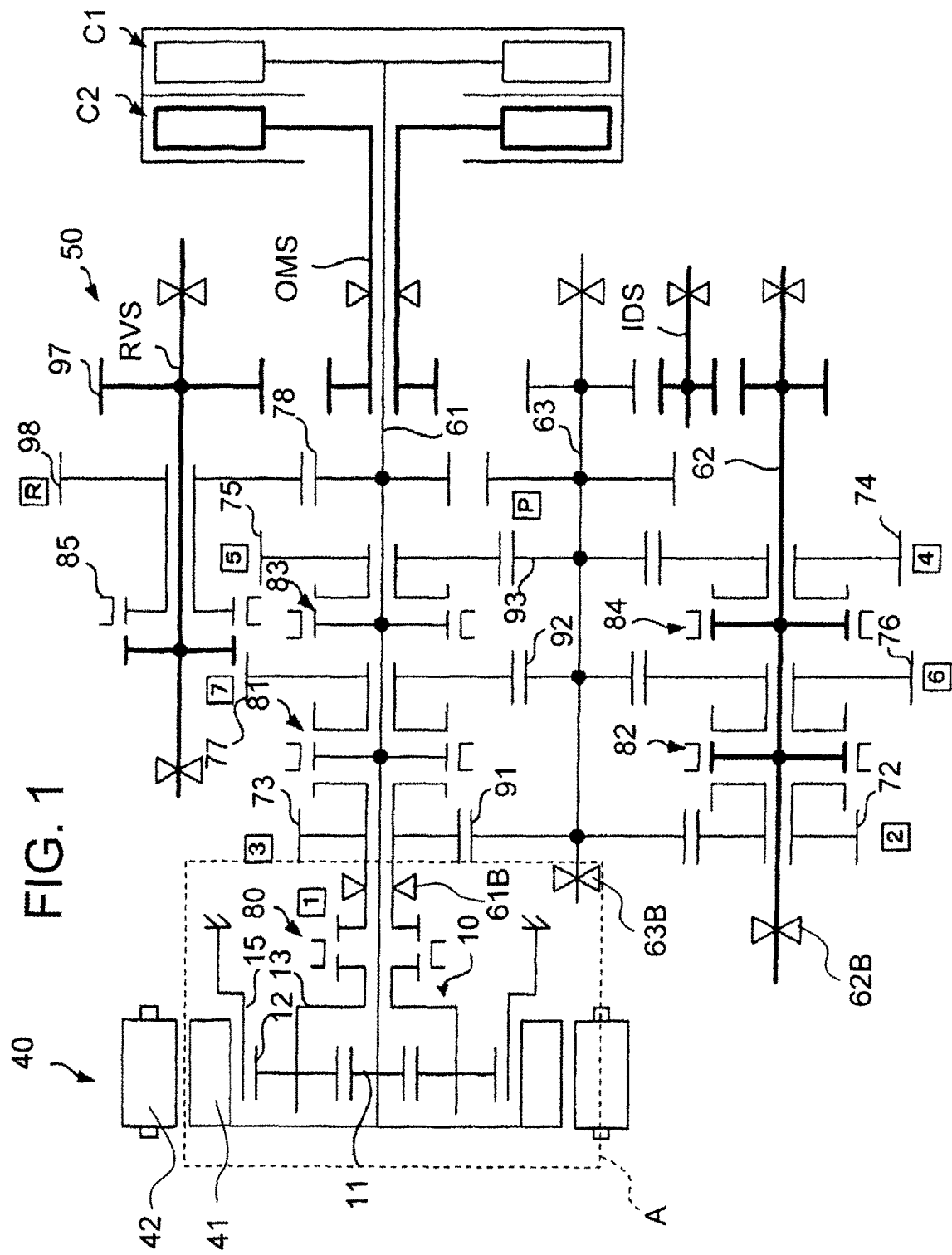
FIG. 1 is a skeleton view of a transmission using a planetary gear mechanism.

An embodiment of the present invention will be described hereinafter with reference to appending drawings. First, a whole configuration of a transmission 50 using a planetary gear mechanism 10 as a power transmission part will be described. FIG. 1 is a skeleton view of the transmission 5 using the planetary gear mechanism 10. The transmission 50 shown in FIG. 1 is a parallel axis-type transmission with seven forward gears and one reverse gear and also a dry- and dual clutch-type transmission.

The transmission 50 includes a first input shaft (first shaft) 61, a second input shaft 62, an output shaft 63 (second shaft) and the planetary gear mechanism 10. The first input shaft (first shaft) 61 is connectably/disconnectably connected, via a first clutch C1 for odd-numbered shift gears, to an internal combustion engine (not shown in the figure). The second input shaft 62 is connectably/disconnectably connected, via a second clutch C2 for even-numbered shift gears, to the internal combustion engine. The output shaft (second shaft) 63 is connected, via a shift gear mechanism provided to the first input shaft 61 and the second input shaft 62, to the first input shaft 61 and the second input shaft 62 to generate a rotary output corresponding to a selected one of shift gears. The planetary gear mechanism 10 is installed on one end side of the first input shaft 61. The first input shaft 61 is rotatably supported by a bearing 61B. Similarly, the second input shaft 62 and the output shaft 63 are rotatably supported respectively by a bearing 62B and a bearing 63B.

An electric motor 40 is arranged at one end of the first input shaft 61. A rotor 41 of the electric motor 40 is fixed to a stator 42 of the electric motor 40 so as to rotate integrally therewith. The rotor 41 functions as a transmission of a hybrid vehicle having the internal combustion engine and the electric motor 40 as drive sources. The output shaft 63 is connected to a differential mechanism, which is not shown in the figure, and drives driving wheels of the vehicle.

A well-known configuration may be appropriately applied as the shift gear mechanism. Still, in order to understand an outline of the embodiment, first, the shift gear mechanism of the transmission 50 excluding the planetary gear mechanism 10 will be outlined, and next, the planetary gear mechanism 10 will be described.

An outer main shaft OMS is connected to the output side of the second clutch C2. This outer main shaft OMS is arranged concentrically so as to form an external cylinder of the first input shaft 61. The outer main shaft OMS is always in engagement, via an idle shaft IDS, with a reverse shaft RVS and the second input shaft 62 so that a rotary output from the second clutch C2 is transmitted to the reverse shaft RVS and the second input shaft 62. These shafts are parallel to each other.

On the first input shaft 61, a third driving gear 73, a seventh driving gear 77 and a fifth driving gear 75 are concentrically arranged so as to be rotatable relative to each other. A third to seventh gear synchromesh mechanism 81 is arranged, so as to be slidable in the axial direction, between the third driving gear 73 and the seventh driving gear 77, and a fifth gear synchromesh mechanism 83 is arranged, so as to be slidable in the axial direction, corresponding to the fifth driving gear 45.

By sliding one of the synchromesh mechanisms corresponding to a desired shift gear to synchronize and engage the shift gear, the shift gear is coupled to the first input shaft 61. These gears and the synchromesh mechanisms installed in connection with the first input shaft 61 constitute a first shift gear mechanism for establishing the odd-numbered (or third, fifth and seventh) shift gears.

Each of the driving gears of the first shift gear mechanism meshes with a corresponding one of driven gears installed on the output shaft 63. Specifically, the third driving gear 73, the seventh driving gear 77 and the fifth driving gear 75 mesh respectively with a first driven gear 91, a second driven gear 92 and a third driven gear 93. The engagement in this manner rotatively drives the output shaft 63.

In the same manner, on the second input shaft 62, a second driving gear 72, a sixth driving gear 76 and a fourth driving gear 74 are concentrically arranged so as to be rotatable relative to each other. A second to sixth gear synchromesh mechanism 82 is arranged, so as to be slidable in the axial direction, between the second driving gear 72 and the sixth driving gear 76, and a fourth gear synchromesh mechanism 84 corresponding to the fourth driving gear 74 is arranged so as to be slidable in the axial direction.

By sliding one of the synchromesh mechanisms corresponding to a desired shift gear to synchronize and engage the shift gear, the shift gear is coupled to the second input shaft 62. These gears and the synchromesh mechanisms installed in connection with the second input shaft 62 constitute a second shift gear mechanism for establishing the even-numbered (or second, fourth and sixth) shift gears.

Each of the driving gears of the second shift gear mechanism meshes with a corresponding one of driven gears installed on the output shaft 63. Specifically, the second driving gear 72, the sixth driving gear 76 and the fourth driving gear 74 mesh respectively with the first driven gear 91, the second driven gear 92 and the third driven gear 93. The engagement in this manner rotatively drives the output shaft 63.

The planetary gear mechanism 10 is arranged at one end, closer to the electric motor 40, of the first input shaft 61. The planetary gear mechanism 10 includes a sun gear 11, a pinion gear 12 and a ring gear 15. The sun gear 11 is fixed to the first input shaft 61 to rotate integrally with the first input shaft 61 and the electric motor 40. The ring gear 15 is fixed to the case 51 of the transmission 50 via a mounting member 20, which will be described later, and configured to generate a shift output from a carrier 13 of the pinion gear 12.

Between the carrier 13 and the third driving gear 73 on the first input shaft 61, a first gear synchromesh mechanism 80 is provided. In this embodiment, due to a functional demand that the first gear synchromesh mechanism 80 needs to transmit a rotation of the carrier 13 of the pinion gear 12 to the output shaft 63, the first gear synchromesh mechanism 80 is arranged closer to the first input shaft 61, the second input shaft 62 and the output shaft 63 than to the planetary gear mechanism.

This first gear synchromesh mechanism 80 is turned ON in response to selection of the first gear, whereby the carrier 13 is connected to the third driving gear 73 on the first input shaft 61. Then, a rotation of the carrier 13 is transmitted to the gear 73 to rotatively drive the output shaft 63 via the first driven gear 91. Consequently, a rotation speed of the first input shaft 61 is changed at a gear ratio for the first gear determined by a combination of a gear ratio of the planetary gear mechanism 10 and a gear ratio of the third driving gear 73. Then, the speed-changed rotation is output from a final output shaft (not shown in the figure) via the output shaft 63.

It should be noted that as the third to seventh gear synchromesh mechanism 81 is at a neutral position at this time, the third to seventh gear synchromesh mechanism 81 remains disengaged with the third driving gear 73. When the second to seventh gears higher than the first gear are selected, the first gear synchromesh mechanism 80 is OFF. Thus, the carrier 13 remains disconnected to the third driving gear 73 and necessarily disconnected to the output shaft 63.

In this manner, the synchromesh mechanism 80 functions as a connecting element provided so as to be connectable/disconnectable to the carrier 13 for selecting a predetermined shift gear and configured to transmit a rotation of the carrier 13 to the output shaft 63 when the synchromesh mechanism 80 is connected to the carrier 13. A configuration other than the synchromesh mechanism may be applied as such connecting element as far as having a similar function.

The present embodiment has such configuration that the ring gear 15 is always fixed in the planetary gear mechanism 10, and when a predetermined shift gear (for example, the first shift stage) is selected, a rotation of the carrier 13 is transmitted via the synchromesh mechanism 80 and the third driving gear 73 to the output shaft 63. Separated from the third driving gear 73 when a shift gear except the predetermined shift gear is selected, the carrier 13 never rotates accompanied by a rotation of the output shaft 63, but only rotates according to a rotation of the sun gear 11 in response to a rotation of the first input shaft 61.

Moreover, the ring gear 15 is always fixed and accordingly never rotates. In this manner, never rotating accompanied by the rotation of the output shaft 63, the carrier 13 can suppress a differential rotation of the planetary gear mechanism 10, in particular, in a higher vehicle speed range with a large workload. Therefore, idling loss can be reduced to a large extent, and also heat generation due to rolling friction can be suppressed. With such reduction and suppression, power transmitting efficiency of the transmission 50 improves as well as fuel economy and cooling performance.

Next, the reverse shaft RVS will be described. A gear 97 in engagement with the idle shaft IDS is fixed to the reverse shaft RVS. In addition, on an outer periphery of the reverse shaft RVS, a reverse gear is provided for selectively connecting the reverse shaft RVS to the first input shaft 61.

The reverse gear is composed of a reverse driving gear 98 provided to the reverse shaft RVS so as to be concentric with and rotatable relative to the reverse shaft RVS, a reverse synchromesh mechanism 85 for selectively connecting the reverse driving gear 98 to the reverse shaft RVS and a gear 78 fixed to the first input shaft 61 so as to mesh with the reverse driving gear 98.

The reverse synchromesh mechanism 85 is slidable in the axial direction of the reverse shaft RVS. The reverse synchromesh mechanism 85 is OFF at the time of forward travel. In other words, the reverse shaft RVS remains disengaged with the reverse driving gear 98. At the time of reverse travel, on the other hand, the reverse synchromesh mechanism 85 is ON, or namely, the reverse shaft RVS is engaged with the reverse driving gear 98.

Figure 2:
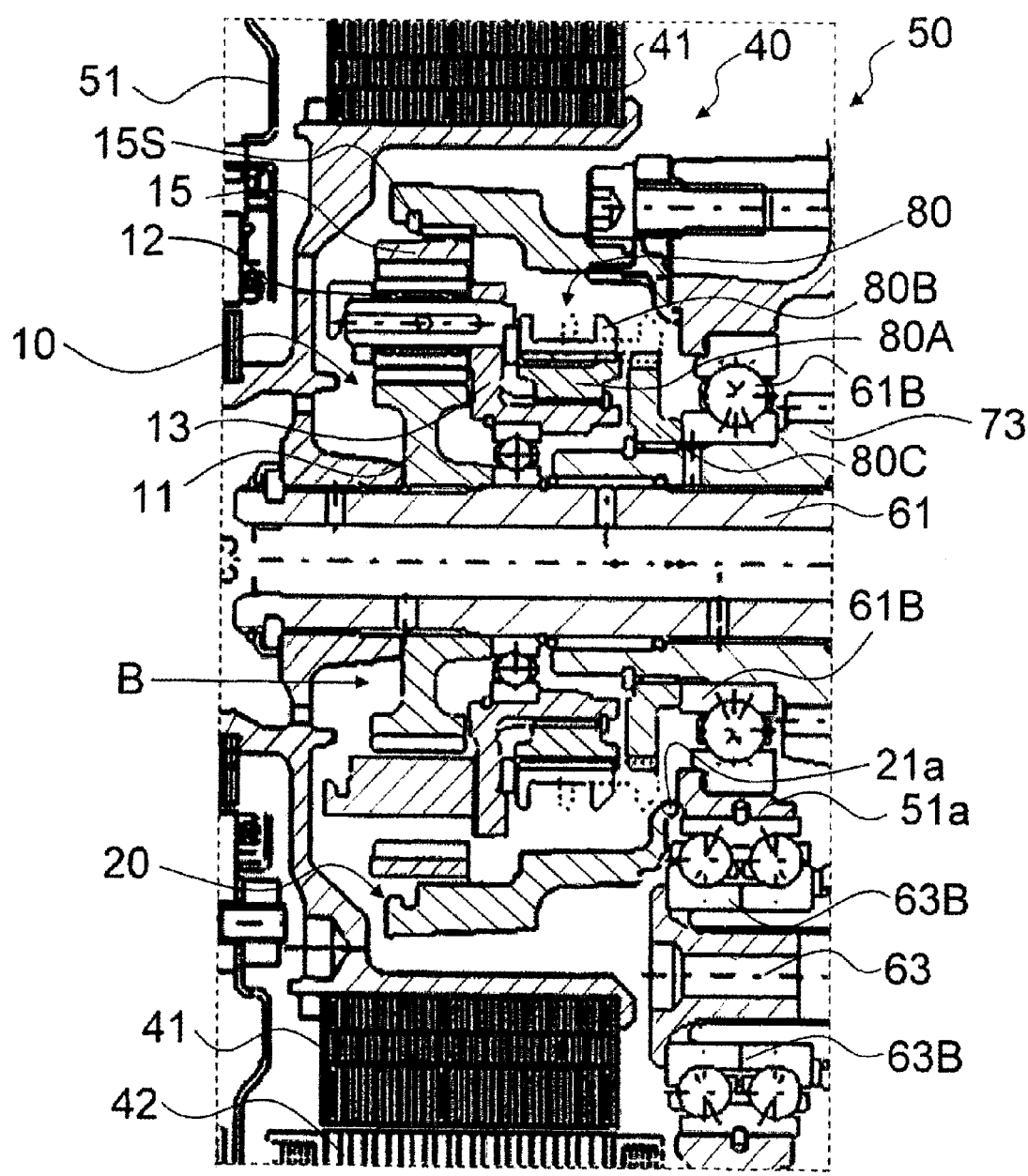
FIG. 2 is an axial sectional view illustrating a periphery around a planetary gear mechanism, a first input shaft and an output shaft.

The positional relationship between the planetary gear mechanism 10 in this embodiment and the two rotating shafts (namely, the first input shaft 61 and the output shaft 63) related to the planetary gear mechanism 10 will be described. FIG. 2 is an axial sectional view illustrating a periphery around the planetary gear mechanism, the first input shaft and the output shaft 63. FIG. 2 shows a structure of Part A of FIG. 1.

As shown in FIG. 2, the planetary gear mechanism 10 is arranged at the one end, closer to the electric motor 40, of the first input shaft 61 to which a driving force from the internal combustion engine is input. The output shaft 63 is arranged parallel to the first input shaft 61 and connected thereto, via the shift gear mechanism provided on the first input shaft 61 to generate a rotary output corresponding to a selected one of shift gears. The first input shaft 61 and the output shaft 63 are rotatably supported respectively by the bearing 61B and the bearing 63B.

The planetary gear mechanism 10 includes the sun gear 11 disposed on the first input shaft 61, the plurality of the pinion gears meshing with the outer periphery of the sun gear 11, the carrier 13 supporting the plurality of the pinion gears 12 and the ring gear 15 meshing with the pinion gear 12 on the outer diameter side of the carrier 13. The ring gear 15 is prevented by a retaining member 15S from dropping out of the mounting member 20.

The first gear synchromesh mechanism 80 (connecting/disconnecting mechanism) has a well-known structure. Namely, the synchromesh mechanism 80 includes a synchronizer hub 80A, a synchronizer sleeve 80B that rotates integrally with the synchronizer hub 80A by spline-coupling and engages with the synchronizer hub 80A so as to be axially displaceable relative thereto, a synchronizer ring (not shown in the figure), a dog spline portion 80C having a tapered surface that frictionally engages with a tapered frictional surface of the synchronizer ring and other components.

The synchronizer sleeve 80B moves in the axial direction using a shift fork 90, which is not shown in the figure, to connect/disconnect the dog spline portion 80C of the synchromesh mechanism 80. In other words, the synchronizer sleeve 80B moves between the position indicated by the dotted line and the position indicated by the solid line in FIG. 2.

The planetary gear mechanism 10 is housed in the case 51 serving as a housing of the transmission 50. The planetary gear mechanism 10 is fixed to the case 51 using the mounting member 20 for fixing the ring gear 15 to the case 51. The mounting member 20 has an abutment support portion 21a as a part of the mounting surface 21 that is an end surface of the mounting surface 21, and positioned between a first through opening 22A and second through opening 22B. The abutment support portion 21a abuts to an inter-shaft portion 51a positioned between the first input shaft 61 and the output shaft 63 in the case 51. Consequently, the mounting member 20 supports the case 51 while allowing the abutment support portion 21a to abut to the inter-shaft portion 51a.

As shown in FIG. 2, the abutment support portion 21a of the mounting member 20 supports the bearing 63B on the opposite side to the output shaft 63. Due to meshing of the gears, the output shaft 63 generates a large load in the axial direction, namely, to the left side in the figure, whereby the inter-shaft portion 51a of the case 51 receiving this load necessarily receives a large stress. Here, the abutment support portion 21a of the mounting member 20 abuts to and thus support the inter-shaft portion 51a of the case 51, thereby reducing the above-mentioned stress occurring to the inter-shaft portion 51a.

Figure 3:
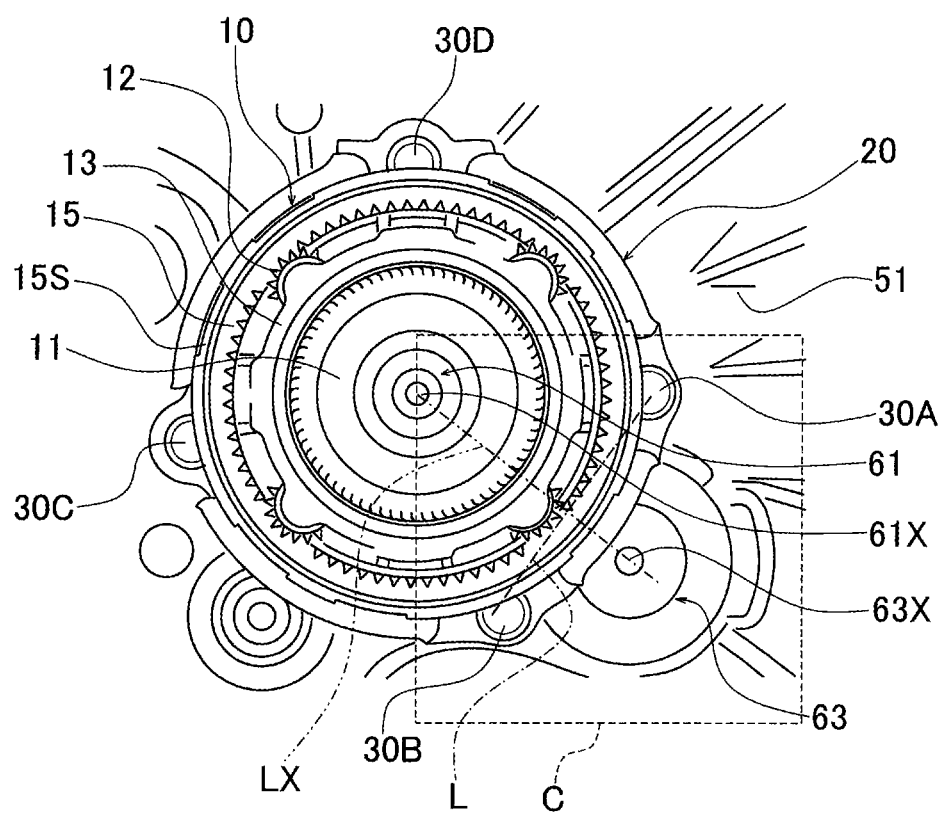
FIG. 3 is a side view of a case illustrating an installation condition of a planetary gear mechanism.

Next, a detailed configuration that the planetary gear mechanism 10 is fixed to the case 51 using the mounting member 20 will be described. FIG. 3 is a side view of the case 51 illustrating an installation condition of the planetary gear mechanism 10, omitting the electric motor 40, viewed from Arrow B of FIG. 2.

As shown in FIG. 3, the mounting member 20 has a plurality of fixing members 30 such as a volt for fixing the mounting member 20 to the case 51. In this embodiment, four fixing members such as a first fixing member 30A, a second fixing member 30B, a third fixing member 30C and a fourth fixing member 30D are disposed on the outer periphery of the mounting member 20 for fixing the mounting member 20 to the case 51.

Line L connecting between at least two of the plurality of the fixing members 30 (an imaginary one dot chain line of FIG. 3) needs to intersect with Line LX connecting between a shaft center 63X of the first input shaft 61 and a shaft center 61X of the output shaft 63 (an imaginary two dot chain line of FIG. 3). And, Line L needs to be positioned closer to the output shaft 63 than to the shaft center 61X of the first input shaft 61. In this embodiment, the first fixing member 30A and the second fixing member 30B serve as the said two fixing members. The first fixing member 30A and the second fixing member 30B are positioned so as to sandwich the abutment support portion 21a.

Figure 4:
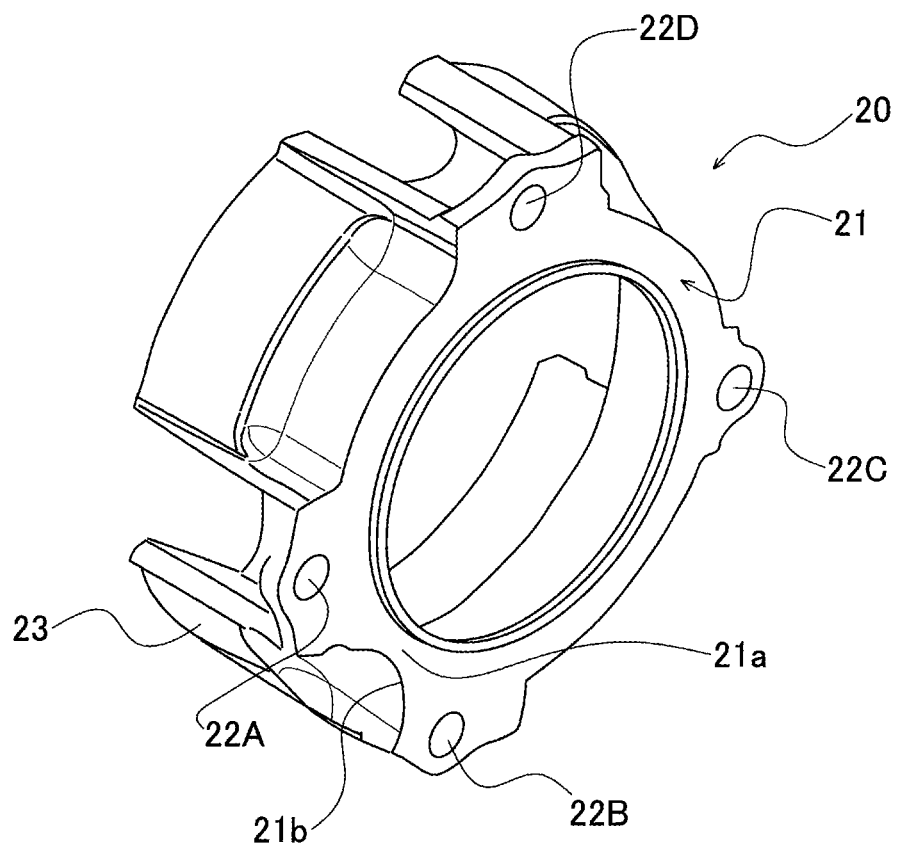
FIG. 4 is an oblique view of a mounting member viewed from a mounting surface side.

Next, a mounting structure for mounting the mounting member 20 to the case 51 will be described. FIG. 4 is an oblique view of the mounting member 20 viewed from the mounting surface 21 side. The mounting surface 21 that is planar in shape is formed on the case 51 side of the mounting member 20. On the mounting surface 21, the through openings 22 are opened so that the plurality of the fixing members 30 penetrate the through openings 22. In this embodiment, four through openings 22 are opened for disposing the four fixing members 30. Specifically, the first through opening 22A, the second through opening 22B, a third through opening 22C and a fourth through opening 22D are formed. And, the first fixing member 30A, the second fixing member 30B, the third fixing member 30C and the fourth fixing member 30D respectively penetrate these four through openings.

As described above, as the abutment support portion 21a supporting the case 51, a portion of the mounting surface 21 sandwiched between the first through opening 22A and the second through opening 22B abuts to the inter-shaft portion 51a. In addition, a hollow portion 21b is formed to the abutment support portion 21a by hollowing a portion of the abutment support portion 21a facing an end portion of the output shaft 63. As shown in FIG. 4, the hollow portion 21b is formed so as to be hollowed inward from the outer periphery 23 of the mounting member 20.

Figure 5:
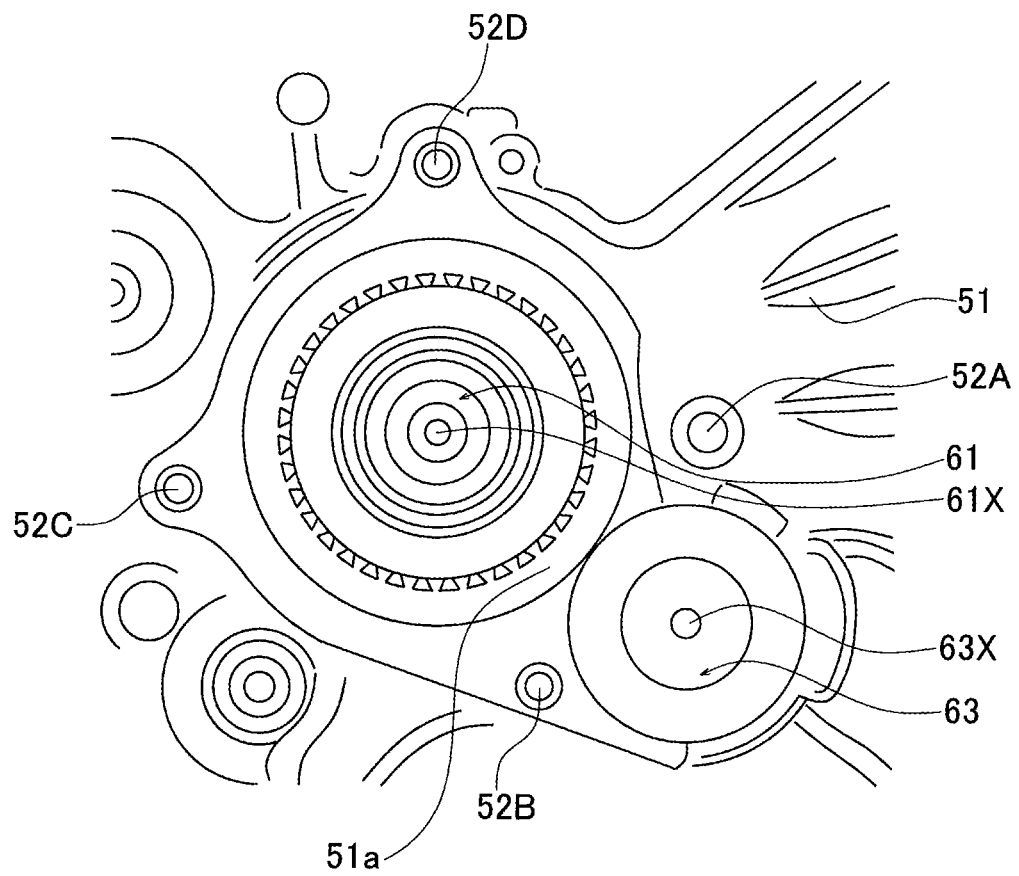
FIG. 5 is a side view illustrating a condition of a transmission case before a planetary gear mechanism is mounted.
Figure 6:
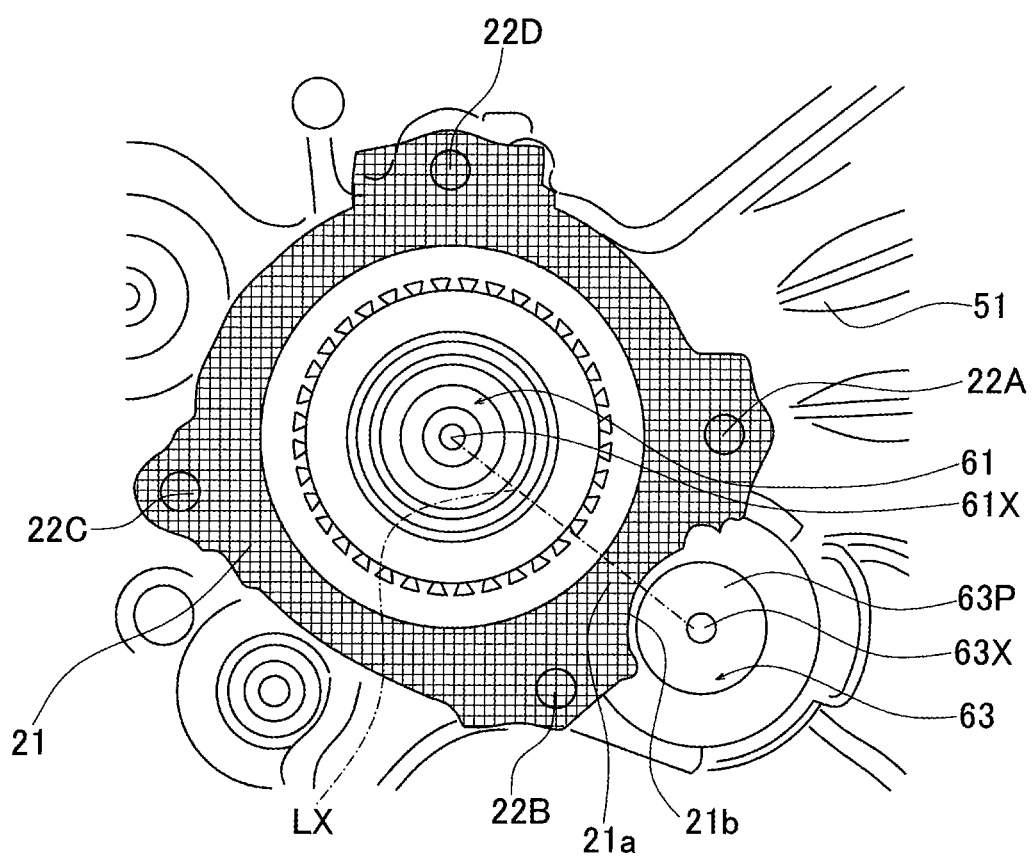
FIG. 6 is a side view illustrating a transmission case showing a position at which a mounting surface of a mounting member is arranged.

Next, a position at which the mounting member 20 of the planetary gear mechanism 10 is mounted to the case 51 will be described with reference to FIGS. 5 and 6. FIG. 5 is a side view illustrating a condition of the case 51 of the transmission 50 before the planetary gear mechanism 10 is mounted thereto. FIG. 6 is a side view illustrating the case 51 of the transmission 50 showing a position at which the mounting surface 21 of the mounting member is arranged.

As shown in FIG. 5, as many fixing holes 52, such as screw holes, as the fixing members 30 are formed at a position at which the planetary gear mechanism 10 is mounted in the case 51. In this embodiment, four fixing holes 52 are opened for fixing the four fixing members 30. Specifically, a first fixing hole 52A, a second fixing hole 52B, a third fixing hole 52C and a fourth fixing hole 52D are formed so as respectively to fix the first fixing member 30A, the second fixing member 30B, the third fixing member 30C and the fourth fixing member 30D.

The mounting member 20 of the planetary gear mechanism 10 is mounted to the case 51 at the position, corresponding to the shaded part in FIG. 6, at which the mounting surface 21 is positioned. The abutment support portion 21a of the mounting surface 21 is positioned so as to intersect with Line LX connecting between the shaft center 61X of the first input shaft 61 and the shaft center 63X of the output shaft 63. Moreover, to the portion of the mounting surface 21 facing the end portion in the axial direction of the output shaft 63, the hollow portion 21b is formed in the manner that the hollow portion 21b never overlaps the shaft center 63X. Thus, as a portion 63P (end portion of the output shaft 63) of the periphery of the shaft center 63X projecting in the axial direction never interferes with the mounting surface 21, the shaft center 63X of the output shaft 63 can be positioned closer to the first input shaft 61 side.

Figure 7:
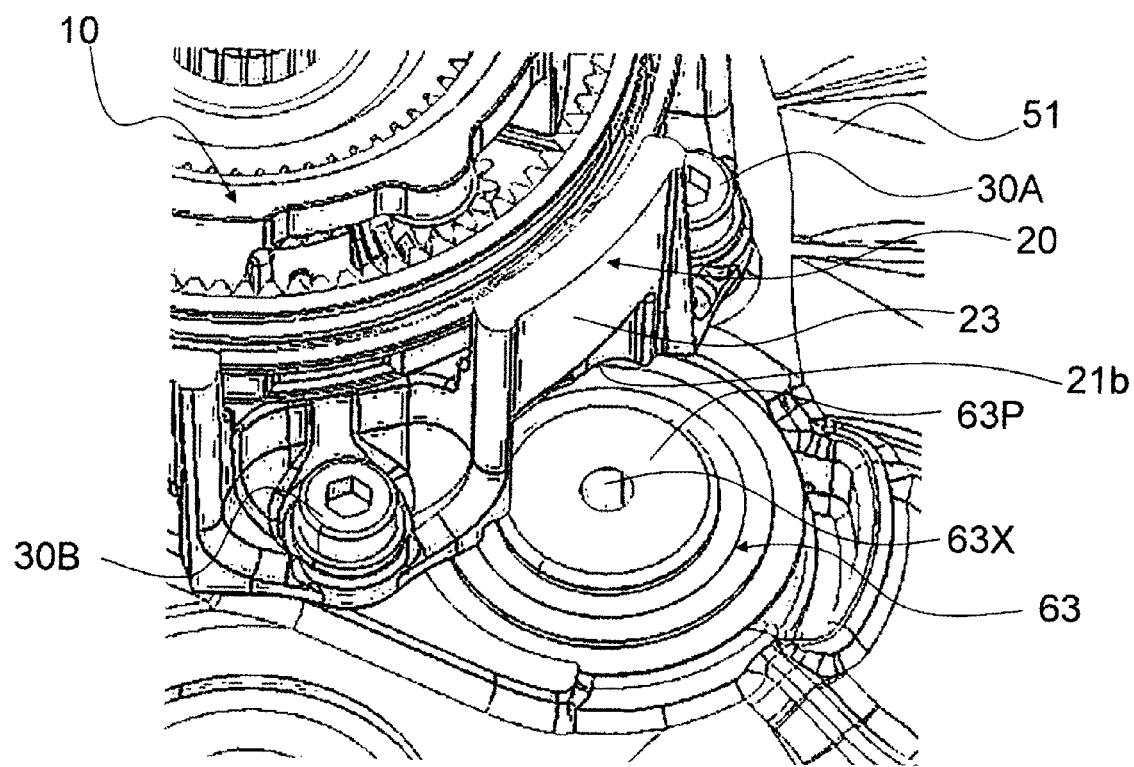
FIG. 7 is an enlarged perspective view illustrating a positional relationship between a hollow portion of a mounting member and an output shaft.

Next, a configuration as to how the portion 63P of the periphery of the shaft center 63X of the output shaft 63 projecting in the axial direction never interferes with the mounting member 20 will be described with reference to FIG. 7. FIG. 7 is an enlarged perspective view, corresponding to Part C of FIG. 3, illustrating the positional relationship between the hollow portion 21b of the mounting member 20 and the output shaft 63.

The hollow portion 21b of mounting member 20 is hollowed inward from the outer periphery 23. Therefore, in the state that the mounting member 20 of the planetary gear mechanism 10 is mounted to the case 51, the portion 63P of the periphery of the shaft center 63X of the output shaft 63 projecting in the axial direction never interferes with the hollow portion 21b of the mounting member 20.

As described above, in the transmission 50 in accordance with this embodiment, due to such configuration that the abutment support portion 21a abuts to and thus supports the inter-shaft portion 51a, the inter-shaft portion 51a is supported by rigidity of the mounting member 20 in addition to rigidity of the case 51. Accordingly, the abutment support portion 21a of the mounting member 20 supports the inter-shaft portion 51a even if the inter-shaft portion 51a is configured to be short in width by configuring a distance between the first shaft 61 and the output shaft 63 to be short. This can achieve stable support of the first input shaft 61 and the output shaft 63. Thus, while the distance between the plurality of the shafts (the first input shaft 61 and the output shaft 63) provided in the transmission is set to be short, the plurality of the shafts (the first input shaft 61 and the output shaft 63) can be supported stably.

Furthermore, in the above-described transmission 50, the abutment support portion 21a of the mounting member 20 may support a load applied to the inter-shaft portion 51a from the output shaft 63. Even if a load is applied to the inter-shaft portion 51a of the case 51 from the output shaft 63 to which a particularly large load occurs due to meshing of the gears, the road can be properly supported.

Moreover, by arranging the first fixing member 30A and the second fixing member 30B so as to sandwich the abutment support portion 21a, the abutment support portion 21a can be fixed at the both sides thereof. Then, to the inter-shaft portion 51a of the case 51 positioned between the first shaft 61 and the output shaft 63, the abutment support portion 21a is fixed so as to intersect with the line LX connecting between the shaft center 61X of the first shaft 61 and the shaft center 63X of the output shaft 63. This can suppress deformation of the case 51, resulting in more stable support of the first shaft 61 and the output shaft 63.

Moreover, in the above-described transmission 50, the hollow portion 21b formed to the abutment support portion 21a by hollowing the portion of the abutment support portion 21a facing the end portion of the output shaft 63 enables the output shaft 63 to be positioned closer to the first shaft 61 side. Accordingly, the distance between the first input shaft 61 and the output shaft 63 can be kept short while the abutment support portion 21a supports the inter-shaft portion 51a.

While the embodiments of the invention have been described, it is to be understood that the invention is not limited to the foregoing embodiments. Rather, the invention can be modified to incorporate any number of variations or alterations within the scope of claims and the scope of technical concept described in the specification and the drawings thereof.

What is claimed is:

1. A transmission comprising:
   a planetary gear mechanism comprising:
      a first shaft to which a driving force is input from an internal combustion engine;
      a second shaft connecting to the first shaft via a shift gear mechanism provided to the first shaft, the second shaft generating a rotary output corresponding to a selected shift gear;
      a sun gear disposed to the first shaft;
      a plurality of pinion gears meshing with an outer periphery of the sun pear;
      a carrier supporting the plurality of the pinion gears; and
      a ring gear meshing with the pinion gear on an outer diameter side of the carrier;
   a case of the transmission for housing the planetary gear mechanism; and
   a mounting member for fixing the ring gear of the planetary gear mechanism to the case,
   wherein an abutment support portion is formed so as to abut to an inter-shaft portion positioned between the first shaft and the second shaft in the case, and the abutment support portion supports a load in the axial direction applied to the inter-shaft portion from the second shaft.

2. A transmission comprising:
   a planetary gear mechanism comprising:
      a first shaft to which a driving force is input from an internal combustion engine;
      a second shaft connecting to the first shaft via a shift gear mechanism provided to the first shaft, the second shaft generating a rotary output corresponding to a selected shift gear;
      a sun gear disposed to the first shaft;
      a plurality of pinion gears meshing with an outer periphery of the sun gear;
      a carrier supporting the plurality of the pinion gears; and
      a ring gear meshing with the pinion gear on an outer diameter side of the carrier;
   a case of the transmission for housing the planetary gear mechanism; and
   a mounting member for fixing the ring gear of the planetary gear mechanism to the case,
   wherein an abutment support portion is formed so as to abut to an inter-shaft portion positioned between the first shaft and the second shaft in the case,
   wherein the mounting member has at least a first fixing member and a second fixing member for fixing the mounting member to the case, and
   wherein the first mounting member and the second mounting member are arranged so as to sandwich the abutment support portion.

3. A transmission comprising:
   a planetary gear mechanism comprising:
      a first shaft to which a driving force is input from an internal combustion engine;
      a second shaft connecting to the first shaft via a shift gear mechanism provided to the first shaft, the second shaft generating a rotary output corresponding to a selected shift gear;
      a sun gear disposed to the first shaft;
      a plurality of pinion gears meshing with an outer periphery of the sun pear;
      a carrier supporting the plurality of the pinion gears; and
      a ring gear meshing with the pinion gear on an outer diameter side of the carrier;
   a case of the transmission for housing the planetary gear mechanism; and
   a mounting member for fixing the ring gear of the planetary gear mechanism to the case,
   wherein an abutment support portion is formed so as to abut to an inter-shaft portion positioned between the first shaft and the second shaft in the case, and the abutment support portion has a hollow portion formed by hollowing a portion of the abutment support portion facing an end portion of the second shaft.

\* \* \* \* \*